(12) United States Patent
Ha

(10) Patent No.: US 7,369,874 B2
(45) Date of Patent: May 6, 2008

(54) APPARATUS AND METHOD FOR IMPROVING GPS RECEIVE SENSITIVITY IN MOBILE TERMINAL

(75) Inventor: Yun-Cheol Ha, Yongsin-si (KR)

(73) Assignee: Samsung Electronics Co., Ltd. (KR)

(*) Notice: Subject to any disclaimer, the term of this patent is extended or adjusted under 35 U.S.C. 154(b) by 409 days.

(21) Appl. No.: 11/199,960

(22) Filed: Aug. 9, 2005

(65) Prior Publication Data

US 2006/0068838 A1    Mar. 30, 2006

(30) Foreign Application Priority Data

Sep. 1, 2004  (KR) .................. 10-2004-0069473

(51) Int. Cl.
*H04M 1/00*    (2006.01)
(52) U.S. Cl. ...................... 455/552.1; 455/553.1; 455/254
(58) Field of Classification Search .............. None
See application file for complete search history.

(56) References Cited

U.S. PATENT DOCUMENTS

2003/0153279 A1* 8/2003 Kang et al. ............ 455/553.1

2006/0234658 A1* 10/2006 Sue et al. ............... 455/552.1

* cited by examiner

*Primary Examiner*—Thanh Cong Le
(74) *Attorney, Agent, or Firm*—The Farrell Law Firm, PC

(57) ABSTRACT

Provided is a Global Positioning System (GPS) receive sensitivity-improving apparatus and method in a Code Division Multiple Access (CDMA) mobile terminal, which improves a GPS receive sensitivity by preventing a reference frequency variation caused by a thermal transient in the CDMA mobile terminal. The mobile terminal includes a transmitter equipped with CDMA/PCS (Personal Communication System) Power Amplifying Modules (PAMs) and a receiver equipped with a CDMA/PCS reception module and a GPS reception module. The CDMA/PCS PAMs remain turned on irrespective of the mobile terminal's operation modes. The CDMA/PCS reception module is turned on in a CDMA/PCS mode, and the GPS reception module is turned on in a GPS mode. The GPS receive sensitivity-improving apparatus and method prevents a GPS receive sensitivity from being affected by a module arrangement on the PCB of the mobile terminal, thereby making it possible to manufacture smaller, lighter and more compact mobile terminals.

6 Claims, 5 Drawing Sheets

APPARATUS AND METHOD FOR IMPROVING GPS RECEIVE SENSITIVITY IN MOBILE TERMINAL

PRIORITY

This application claims priority under 35 U.S.C. § 119 to an application entitled "Apparatus And Method For Improving GPS Receive Sensitivity In Mobile-Phone" filed in the Korean Intellectual Property Office on Sep. 1, 2004 and assigned Serial No. 2004-0069473, the contents of which are incorporated herein by reference.

BACKGROUND OF THE INVENTION

1. Field of the Invention

The present invention relates to a CDMA (Code Division Multiple Access) multi-band mobile terminal, and more particularly, to a GPS (Global Positioning System) receive sensitivity-improving apparatus and method in a CDMA mobile terminal, which improves a GPS receive sensitivity by preventing a reference frequency variation that may be caused by a thermal transient in the CDMA mobile terminal.

2. Background of the Prior Art

FIG. 1 is a block diagram of a GPS receiver inducing a reference frequency variation according to a thermal transient in the conventional mobile terminal.

As shown in FIG. 1, a baseband module 100 processes transmitted/received baseband signals. For example, the baseband module 100 performs channel coding and spreading with respect to transmission data, and performs despreading and channel decoding with respect to a received signal.

A frequency combiner 110 combines desired frequency band signals based on a reference frequency generated by a reference frequency generator 112. A transmitter 120 turns on CDMA/PCS (Personal Communication Service) Power Amplifying Modules (CDMA/PCS PAMs) 122 and 124 for CDMA/PCS transmission in a CDMA/PCS mode. The transmitter 120 performs only CDMA/PCS transmission, not GPS transmission, irrespective of modes.

A receiver 130 performs CDMA/PCS reception in a CDMA/PCS mode, and performs GPS reception in a GPS mode. Generally, the receiver 130 includes a plurality of filters to thereby filter received signals. It should be noted that the CDMA/PCS PAMs are turned off in a GPS mode.

An amplifier 140 amplifies baseband signals processed by the baseband module 100, and then transmits the amplified signals to the CDMA/PCS PAMs of the transmitter 120.

In general, a receive sensitivity is widely used as an indicator for indicating a performance of a GPS receiver. When a mode is converted from a CDMA/PCS mode into a GPS mode, a receive sensitivity of the GPS mode is measured. The GPS receive sensitivity is considerably susceptible to a thermal transient of the reference frequency generator 112.

In general, a receive sensitivity variation caused by a temperature variation is usually proportional to a frequency drift (or variation) caused by the temperature variation. Thus, the frequency drift (FD) of a mobile terminal can be expressed as the following Equation 1.

$$FD(Hz/sec) = S(ppm/°C.) \times G(°C./sec) \times F(Hz) \quad \text{Eq. (1)}$$

where, S is the temperature stability of reference frequency generator, G is the thermal gradient within the mobile terminal (° C./sec), and
F is the center frequency (Hz).

That is, the GPS receive sensitivity is affected by the temperature stability of the reference frequency generator and a PCB (printed circuit board) arrangement, and so on.

When a mode is converted from a CDMA/PCS mode into a GPS mode, the receiver 130 performs GPS reception. At this time, the CDMA/PCS PAMs are turned off. That is, the CDMA/PCS PAMs are turned on in the CDMA/PCS mode but are turned off in the GPS mode. Accordingly, a thermal transient is generated in the reference frequency generator 112 at the mode conversion.

The thermal transient of the reference frequency generator 112 induces a variation in a GPS receive sensitivity. That is, a temperature variation in the CDMA/PCS PAMs affects the performance of the GPS receiver. Moreover, the temperature variation in the CDMA/PCS PAMs further deteriorates a GPS receive sensitivity in a weak electric field areas of the CDMA/PCS communication system.

For solving this problem, the CDMA/PCS PAMs and the reference frequency generator 112 are arranged on the printed circuit board (PCB) in such a way that they are physically spaced apart from each other by as much distance as is reasonably possible. However, such an arrangement of the CDMA/PCS PAMs and the reference frequency generator 112 becomes increasingly difficult as mobile terminals become more compact and decrease in size and weight.

FIG. 2 is a state diagram illustrating a GPS receiving operation state in a conventional mobile terminal.

Generally, in order for a CDMA multi-band mobile terminal to be able to receive a GPS signal while in a CDMA/PCS band, a base station must first command the CDMA multi-band mobile terminal to move to a GPS band.

In response to the command, the mobile terminal converts its frequency band into the GPS band to thereby receive a GPS signal. After receiving the GPS signal, the mobile terminal returns to its original frequency band, that is, a CDMA/PCS band. A state transition sequence in the mobile terminal is illustrated in FIG. 2.

Referring to FIG. 2, the mobile terminal turns on CDMA/PCS PAMs of a transmitter and a CDMA/PCS module of a receiver so as to perform transmission/reception in a CDMA/PCS mode, that is, a CDMA/PCS band.

Accordingly, the transmitter amplifies CDMA/PCS transmission power, and the receiver receives CDMA/PCS signals. At this time, a frequency combiner combines CDMA/PCS frequencies.

If a base station commands conversion to a GPS mode, the mobile terminal converts its frequency band into a GPS band and then receives GPS signals. At this time, the CDMA/PCS PAMs of the transmitter are turned off accordingly as CDMA/PCS frequency emission is terminated.

That is, since transmission is not performed in a GPS mode, the GPS/PCS PAMs are turned off in the GPS mode. In addition, the receiver receives GPS signals, and the frequency combiner combines GPS frequencies.

When the mobile terminal returns to a CDMA/PCS mode, the CDMA/PCS PAMs and the CDMA/PCS module are all turned on.

In the meanwhile, when the mobile terminal is state-transitioned from a CDMM/PCS mode into a GPS mode for GPS reception, the CDMA/PCS PAMs of the transmitter are turned off to thereby induce a temperature variation therein.

The temperature variation causes a thermal transient in the reference frequency generator to thereby deteriorate the GPS receive sensitivity. Such a deterioration of the GPS receive sensitivity is more seriously generated in a weak electric field area requiring a high transmission power or in a high-temperature area.

SUMMARY OF THE INVENTION

The present invention provides a GPS receive sensitivity-improving apparatus and method in a mobile terminal, which can improve a GPS receive sensitivity irrespective of a module arrangement on a PCB of the mobile terminal.

According to an aspect of the present invention, a mobile terminal having an improved GPS receive sensitivity includes: a transmitter equipped with CDMA/PCS PAMs, the CDMA/PCS PAMs remaining turned on irrespective of the mobile terminal's operation modes; and a receiver equipped with a CDMA/PCS reception module and a GPS reception module, the CDMA/PCS reception module being turned on in a CDMA/PCS mode, the GPS reception module being turned on in a GPS mode.

The CDMA/PCS reception module may receive CDMA/PCS signals in the CDMA/PCS mode. The GPS reception module may receive GPS signals in the GPS mode.

According to another aspect of the present invention, a method for improving a GPS receive sensitivity in a mobile terminal includes the steps of: turning on CDMA/PCS PAMs of a transmitter irrespective of the mobile terminal's GPS operation modes; turning on a CDMA/PCS reception module of a receiver in a CDMA/PCS mode; and turning on a GPS reception module of the receiver in a GPS mode.

The CDMA/PCS reception module may receive CDMA/PCS signals in the CDMA/PCS mode. The GPS reception module may receive GPS signals in the GPS mode.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Also, when it is determined that the subject of the invention may be ambiguous by a detailed description, the detailed description will be omitted. Moreover, while the present invention has been described with reference to a CDMA/PCS communication system, the present invention can also be used with TDMA (Time Division Multiple Access), GSM (Global System for Mobile) and other communication systems.

Figure 1:
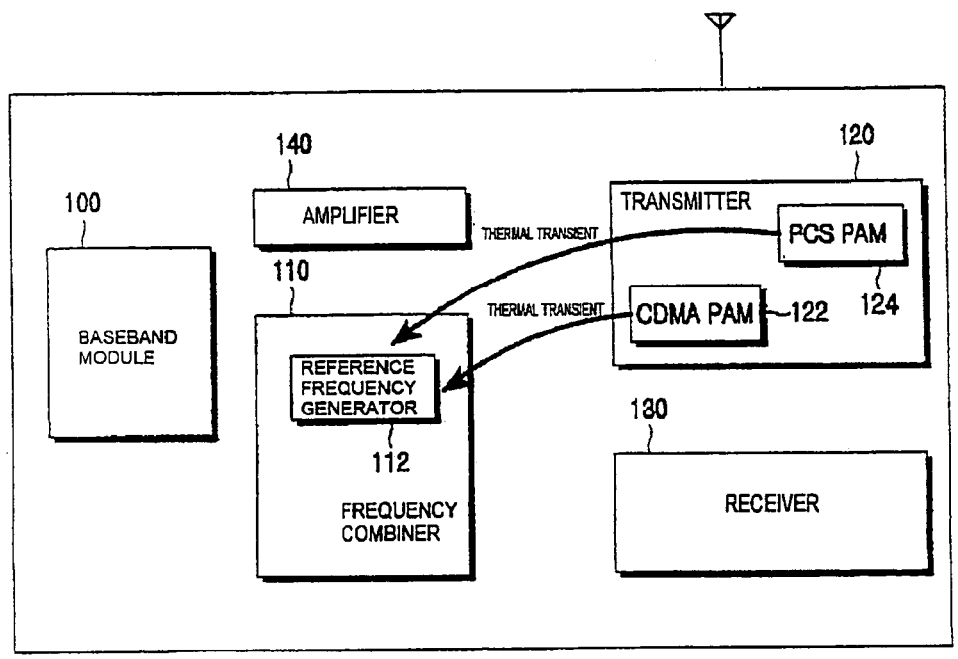
FIG. 1 is a block diagram of a GPS receiver inducing a reference frequency generation error according to a thermal transient in the conventional mobile terminal.
Figure 2:
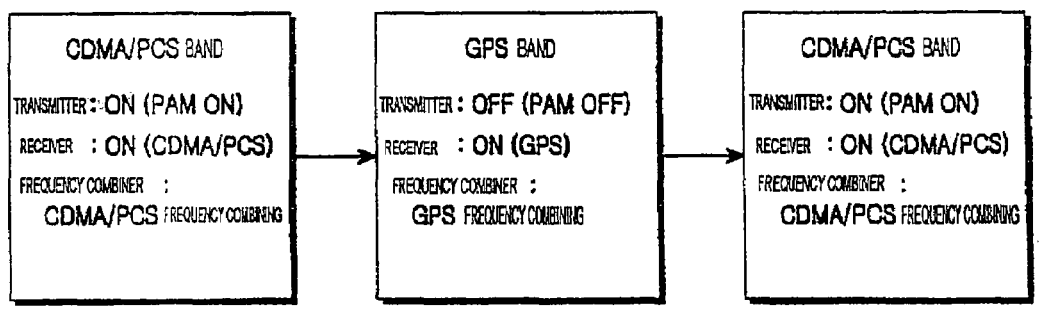
FIG. 2 is a state diagram illustrating a GPS receiving operation state in the conventional mobile terminal.
Figure 3:
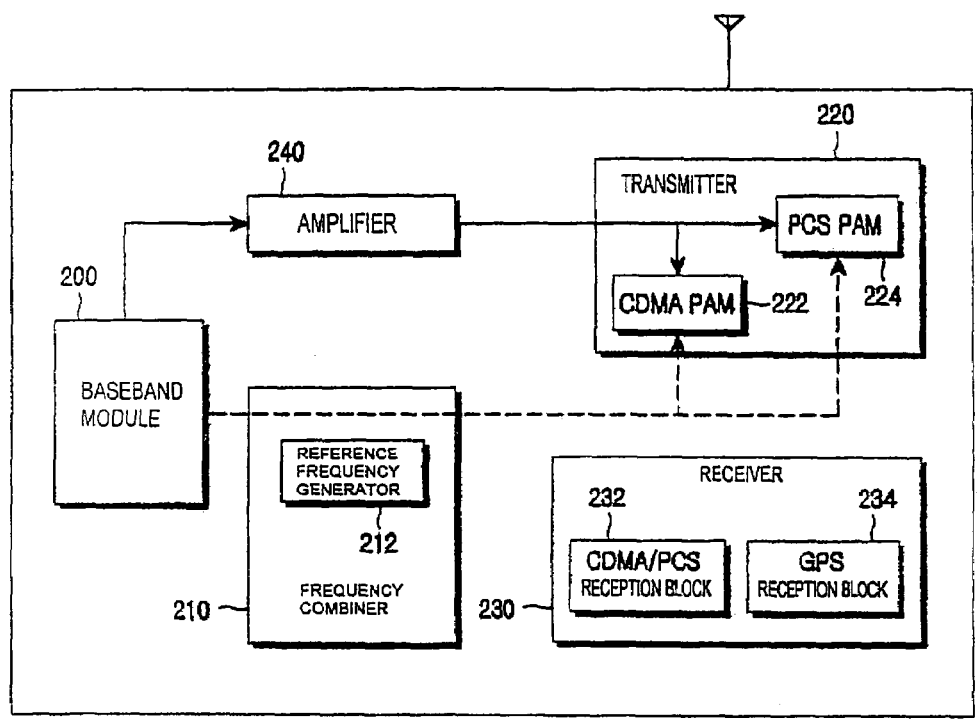
FIG. 3 is a block diagram of a GPS receiver for preventing a reference frequency generation error caused by a thermal transient in a mobile terminal, according to an embodiment of the present invention.

FIG. 3 is a block diagram of a GPS receiver for preventing a reference frequency generation error caused by a thermal transient in a mobile terminal, according to an embodiment of the present invention.

Referring to FIG. 3, a baseband module 200 processes transmitted/received baseband signals. For example, the baseband module 200 performs channel coding and spreading with respect to transmission data, and performs despreading and channel decoding with respect to a received signal.

A frequency combiner 210 combines desired frequency band signals based on a reference frequency generated by a reference frequency generator 212. A transmitter 220 turns on CDMA/PCS power amplifying modules (CDMA/PCS PAMs) for CDMA/PCS transmission in a CDMA/PCS mode.

The transmitter 220 performs only CDMA/PCS transmission and not GPS transmission, irrespective of modes. Accordingly, the transmitter 220 consumes transmission power only by CDMA/PCS transmission, and not by GPS transmission.

A receiver 230 is constructed to include a plurality of filters, and filters received signals to thereby remove a noise of the received signal. A CDMA/PCS reception block 232 of the receiver 230 performs CDMA/PCS reception in a CDMA/PCS mode, and a GPS reception block 234 of the receiver 230 performs GPS reception in a GPS mode.

An amplifier 240 amplifies baseband signals processed by the baseband module 200, and then transmits the amplified signals to CDMA/PCS PAMs 222 and 224 of the transmitter 220.

The present invention is characterized in that the CDMA/PCS PAMs 222 and 224 remain turned on even when the terminal's mode is converted from a CDMA/PCS mode into a GPS mode. That is, the mobile terminal according to the present invention turns on the CDMA/PCS PAMs 222 and 224 not only in the CDMA/PCS mode, but also in the GPS mode. But these are off during the sleep state. Accordingly, a thermal transient, which may be caused by an ON and OFF cycling of the CDMA/PCS PAMs, is not generated when the terminal's mode is converted from a CDMA/PCS mode into a GPS mode.

Figure 4:
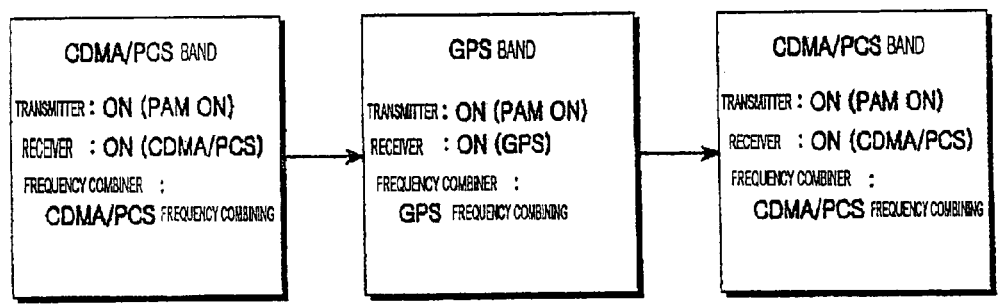
FIG. 4 is a state diagram illustrating a GPS receiving operation state in a mobile terminal, according to an embodiment of the present invention.

FIG. 4 is a state diagram illustrating a GPS receiving operation state in a mobile terminal, according to an embodiment of the present invention.

Referring to FIG. 4, the mobile terminal turns on the CDMA/PCS PAMs of the transmitter and the CDMA/PCS reception block of the receiver so as to perform transmission/reception in a CDMA/PCS mode, that is, a CDMA/PCS band. Accordingly, the transmitter amplifies CDMA/PCS transmission power, and the receiver receives CDMA/PCS signals. The frequency combiner combines CDMA/PCS frequencies.

If a base station commands conversion to a GPS mode, the mobile terminal converts its frequency band into a GPS band and then receives GPS signals. At this time, the CDMA/PCS PAMs of the transmitter remain turned on even though CDMA/PCS frequency emission is terminated.

That is, even when CDMA/PCS transmission is not performed in a GPS mode, the GPS/PCS PAMs remain turned on in the GPS mode. In the GPS mode, the GPS reception block of the receiver is turned on to then receive GPS signals, and the frequency combiner combines GPS frequencies.

When the mobile terminal returns to a CDMA/PCS mode, the CDMA/PCS PAMs of the transmitter remain turned on, and the CDMA/PCS block of the receiver is turned on.

In the meanwhile, although the CDMA/PCS PAMs remain turned on in the GPS mode, the CDMA/PCS PAMs do not generate CDMA/PCS transmission power in the GPS mode because the frequency combiner is set to combine GPS frequencies in the GPS mode.

Moreover, compared with the high power consumption used by the CDMA/PCS PAMs during a CDMA/PCS transmission, the energy consumption used by the CDMA/PCS PAMs during a GPS mode is extremely low. In addition, it has been experimentally demonstrated that the maintenance of the turned-on state of the CDMA/PCS PAMs irrespective of modes increases the GPS receive sensitivity by 50% or more.

Figure 5:
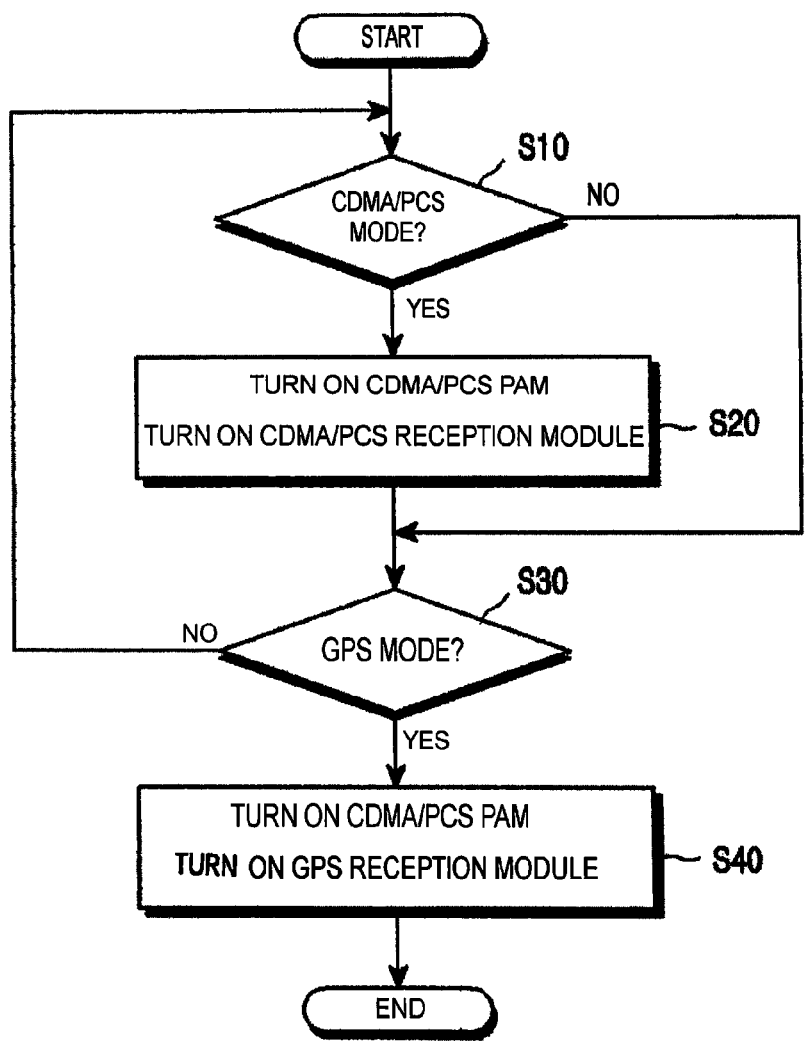
FIG. 5 is a flow chart illustrating a GPS receiving procedure in a mobile terminal, according to an embodiment of the present invention.

FIG. 5 is a flow chart illustrating a GPS receiving procedure in a mobile terminal, according to an embodiment of the present invention.

Referring to FIG. 5, the mobile terminal determines whether it is in a CDMA/PCS mode (S10). If the mobile terminal is in a CDMA/PCS mode, the mobile terminal turns on the CDMA/PCS PAMs of the transmitter and the CDMA/PCS reception module of the receiver (S20).

Accordingly, the transmitter amplifies CDMA/PCS transmission power by the CDMA/PCS PAMs and the receiver receives CDMA/PCS signals by the CDMA/PCS reception module. The frequency combiner combines CDMA/PCS frequencies.

If a base station commands a conversion to a GPS mode, the mobile terminal determines whether its mode is a GPS mode (S30). In case of a GPS mode, the mobile terminal leaves the CDMA/PCS PAMs of the transmitter turned on and turns on the GPS reception module of the receiver (S40). At this time, the mobile terminal converts its frequency band into a GPS band and then receives GPS signals. Here, the CDMM/PCS PAMs remain turned on even though CDMA/PCS frequency emission is terminated. That is, even when CDMA/PCS transmission is not performed in the GPS mode, the GPS/PCS PAMs remain turned on in the GPS mode.

In the GPS mode, the GPS reception block of the receiver is turned on to then receive GPS signals, and the frequency combiner combines GPS frequencies. When the mobile terminal returns to a CDMA/PCS mode, the aforementioned operation is repeated.

As described previously, the GPS receive sensitivity-improving apparatus and method according to the present invention maintains the turning-on state of the CDMA/PCS PAMs irrespective of the mobile terminal's operation modes, thereby making it possible to substantially improve the GPS receive sensitivity even in a weak electric field area having high transmission power or a high-temperature area.

As stated above, the present invention improves the GPS receive sensitivity of mobile terminals so that the manufacture of smaller, lighter and more compact mobile terminals is possible. Moreover, the present invention prevents the GPS receive sensitivity from being substantially affected by a module arrangement on the PCB, thereby making it possible to improve the GPS receive sensitivity in a weak electric field area which usually requires the mobile terminal to enter into a high transmission power mode. Furthermore, the present invention prevents the GPS receive sensitivity from being affected by a module arrangement on the PCB, thereby making it possible to improve the GPS receive sensitivity in elevated temperature areas that can be present or generated in actual use (e.g., in an automobile, or during high transmission power modes, etc.).

The forgoing embodiments are merely exemplary and are not to be construed as limiting the present invention. The present teachings can be readily applied to other types of apparatuses (e.g., Personal Digital Assistants PDA's etc. and other communication systems such as TDMA, GSM, etc). The description of the present invention is intended to be illustrative, and not to limit the scope of the claims. Many alternatives, modifications, and variations will be apparent to those skilled in the art.

What is claimed is:

1. A mobile terminal having an improved GPS (Global Positioning System) receive sensitivity, the mobile terminal comprising:
   a transmitter equipped with CDMA/PCS (Code Division Multiple Access/Personal Communication Service) PAMs (Power Amplifying Modules), the CDMA/PCS PAMs remaining turned on irrespective of GPS operation modes of the mobile terminal; and
   a receiver equipped with a CDMA/PCS reception module and a GPS reception module, the CDMA/PCS reception module being turned on in a CDMA/PCS mode, the GPS reception module being turned on in a GPS mode.

2. The mobile terminal of claim 1, wherein the CDMA/PCS reception module receives CDMA/PCS signals in the CDMA/PCS mode.

3. The mobile terminal of claim 1, wherein the GPS reception module receives GPS signals in the GPS mode.

4. A method for improving a GPS receive sensitivity in a mobile terminal, the method comprising the steps of:
   turning on CDMA/PCS PAMs of a transmitter irrespective of the mobile terminal's GPS operation modes;
   turning on a CDMA/PCS reception module of a receiver in a CDMA/PCS mode; and
   turning on a GPS reception module of the receiver in a GPS mode.

5. The method of claim 4, wherein the CDMA/PCS reception module receives CDMA/PCS signals in the CDMA/PCS mode.

6. The method of claim 4, wherein the GPS reception module receives GPS signals in the GPS mode.

* * * * *